(12) United States Patent  
Studnicka et al.

(10) Patent No.: US 12,370,763 B2
(45) Date of Patent: Jul. 29, 2025

(54) METHOD AND TOOL FOR CONTROLLED APPLICATION OF SEALANT MATERIAL

(71) Applicant: Caterpillar Inc., Peoria, IL (US)

(72) Inventors: Seth Carl Studnicka, Chillicothe, IL (US); Subhro Nathak, Peoria, IL (US); Jay C Landsiedel, Edwards, IL (US); David G Turner, Mossuille, IL (US); Jay Hamilton Cline, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 27 days.

(21) Appl. No.: 17/726,384

(22) Filed: Apr. 21, 2022

(65) Prior Publication Data

US 2023/0339197 A1 Oct. 26, 2023

(51) Int. Cl.
*B29C 73/02* (2006.01)
*B29L 31/26* (2006.01)
*F16J 15/14* (2006.01)

(52) U.S. Cl.
CPC ............... *B29C 73/02* (2013.01); *F16J 15/14* (2013.01); *B29L 2031/265* (2013.01)

(58) Field of Classification Search
CPC .......... B29C 73/02; B29C 73/16; F16J 15/14; B29L 2031/265
See application file for complete search history.

(56) References Cited

U.S. PATENT DOCUMENTS

| | | | | |
|---|---|---|---|---|
| 4,181,313 A | * | 1/1980 | Hillier | F16J 15/104 277/638 |
| 4,761,364 A | * | 8/1988 | Schmauder | G03F 7/12 430/320 |
| 6,171,399 B1 | | 1/2001 | Kaiser et al. | |
| 6,253,675 B1 | | 7/2001 | Mayer | |
| 8,568,827 B2 | | 10/2013 | Liu et al. | |
| 2003/0011139 A1 | * | 1/2003 | Miyaoh | F16J 15/0818 277/592 |
| 2003/0030172 A1 | * | 2/2003 | Hoogland | B29C 45/14688 264/161 |
| 2009/0127800 A1 | * | 5/2009 | Tunnell | F16J 15/062 277/591 |

(Continued)

FOREIGN PATENT DOCUMENTS

JP  2005164050 A  *  6/2005

OTHER PUBLICATIONS

English translation of JP2005164050A retrieved from Espacenet (Year: 2024).*

(Continued)

*Primary Examiner* — Jacob T Minskey
*Assistant Examiner* — Elisa H Vera
(74) *Attorney, Agent, or Firm* — Bookoff McAndrews, PLLC

(57) ABSTRACT

A method of controlled deposition of a liquid or semi-liquid sealant material is disclosed herein. The method includes the use of a template which allows the sealant material to be deposited as a bead onto a surface of a specific machine part. The placement and shape of the bead, including route and volume, can be controlled using the template. The placement and shape of the bead can correspond to features of the specific machine part. A machine repair kit configured for repair or assembly of the specific machine part can include the template and a sealant material compatible with the template.

20 Claims, 8 Drawing Sheets

(56) References Cited

U.S. PATENT DOCUMENTS

| | | | |
|---|---|---|---|
| 2011/0039022 A1* | 2/2011 | Speer | B29C 73/02 |
| | | | 427/140 |
| 2015/0090134 A1 | 4/2015 | Li et al. | |
| 2017/0050426 A1 | 2/2017 | St. Pierre et al. | |
| 2021/0300015 A1* | 9/2021 | Pearce | A61L 24/046 |

OTHER PUBLICATIONS

Kurcz, Timothy J. "Design Parameters for Successful FIP Gasketing" SAE Technical Paper Series 930121. Downloaded Jul. 25, 2014. pp. 8.

* cited by examiner

METHOD AND TOOL FOR CONTROLLED APPLICATION OF SEALANT MATERIAL

TECHNICAL FIELD

The embodiments described herein are generally directed to machine repair, and, more particularly, to methods and tools for controlled application of sealant on a machine surface in a field environment.

BACKGROUND

Machines, including various machine parts and sub-systems, are often manufactured and assembled in factories using precise, often computer-controlled instruments. This includes the creation and application of seals and/or gaskets used between machine parts. For example, in a factory setting, a seal or gasket with a specific, predetermined shape can be created by instruments programmed to print or deposit the seal or gasket material in the predetermined shape. If a machine joint requires a seal having a complicated routing shape and specific variations in thickness, appropriately programmed factory instruments can easily manufacture such a seal. However, the same cannot be said for a technician trying to recreate the seal once the machine is out of the factory (e.g., in the field).

Machine repair and assembly in a field environment may require a technician to form a complicated seal or gasket using a sealing material provided in a liquid or semi-liquid form (often in a tube). A technician might attempt to do this by carefully squeezing out a bead of sealing material onto a machine part surface along a specified route. However, by hand, it is both difficult and time consuming to form a bead along a specified route with the precision required by certain machine joints (e.g., with a tolerance of less than a mm or a few mms). Furthermore, it is difficult for even a skilled person to estimate precise amounts of material, so if the formation of a seal at a particular machine junction calls for specific volumes of sealing material, a technician would not be able to meet that requirement.

There needs to be a solution that would allow a quicker application of liquid or semi-liquid sealing material as a bead having a controlled route, with controlled amounts of material along the route, and correct placement with respect to features (e.g., edges, bolts, openings, etc.) of the surface. There also needs to be a machine service tool that would allow for precise serviceability of particular parts of the machine (e.g., joints) that is easy to use and travel with.

U.S. Pat. No. 8,568,827 discloses a masking tool with defined openings which can be changed according to requirements. The masking tool is used to deposit a textured coating on a component surface. However, the masking tool described in the above patent cannot be provided as a service tool, does not provide precise volume and depth control for the textured coating, and is not configured to be used in the field.

The present disclosure is directed toward overcoming one or more of the problems discovered by the inventor.

SUMMARY OF THE INVENTION

In an embodiment, a method of forming a seal between first and second mating surfaces of a specific machine part is disclosed. The method comprises positioning a template onto the first mating surface of the machine component, the template having at least one opening; depositing a sealing material into the at least one opening to create a bead three-dimensional of the sealing material in a first configuration corresponding to a three-dimensional shape of the opening; removing the template from the first mating surface of the specific machine part, wherein removing the template leaves behind the bead of the sealing material on the first mating surface; and positioning the second mating surface of the specific machine part onto and in contact with the bead.

In an embodiment, a field repair kit is disclosed. The field repair kit comprises a first template configured for making an in-place seal on a surface of a first machine part, the first template having at least a first channel extending through the first template from a top side through a bottom side; and at least a first container holding a first type of sealing compound, wherein the at least first channel is configured to receive and release the first type of sealing compound.

In another embodiment, a template configured to facilitate controlled deposition of a bead of liquid or semi-liquid compound onto a surface of a machine component is disclosed. The template comprises at least one channel configured to receive the liquid or semi-liquid compound, wherein the channel extends along a route within a plane defined by the template that, when the template is aligned onto the machine surface, is configured to avoid one or more features of the machine surface, and wherein the channel has at least two side walls having one or more predetermined draft angles.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

FIGS. 1-4 show an exemplary template 100 configured for depositing at least one three-dimensional bead of sealant or gasket material onto a surface of a specific machine part or component in order to form a seal or gasket in the specific machine part. A three-dimensional bead of sealant material includes a length having a route/path as well as multiple cross-sectional areas taken along planes perpendicular to the directions of the route.

The template 100 is shown to have a particular shape and a particular configuration of features in order to correspond or match to a surface of a specific machine part or component (e.g., an engine block and its front housing, not shown). However, it should be understood that the disclosed invention may be applied to repair or assembly of a variety of different machine or appliance parts that require a seal or gasket to be formed in place. For example, the disclosed invention may be applied to repair or assembly of a housing cover, an oil pan gasket, a valve cover, etc. The shape and various features of the template 100 of the present disclosure are determined by requirements of a particular repair or assembly job (e.g., a particular geometry of the mating surfaces of the machine part, the properties of the sealant, etc.).

Figure 1:
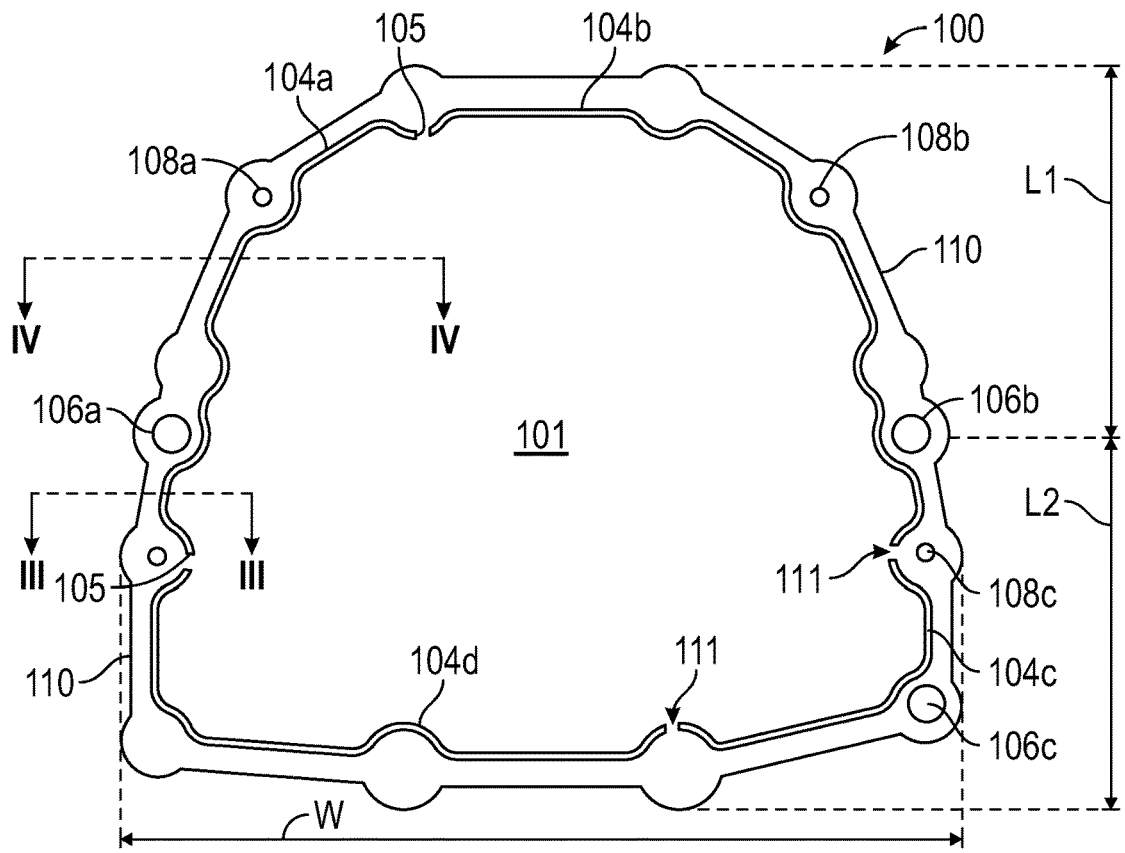
FIG. 1 is a top plan view of a template, according to an exemplary embodiment.
Figure 2:
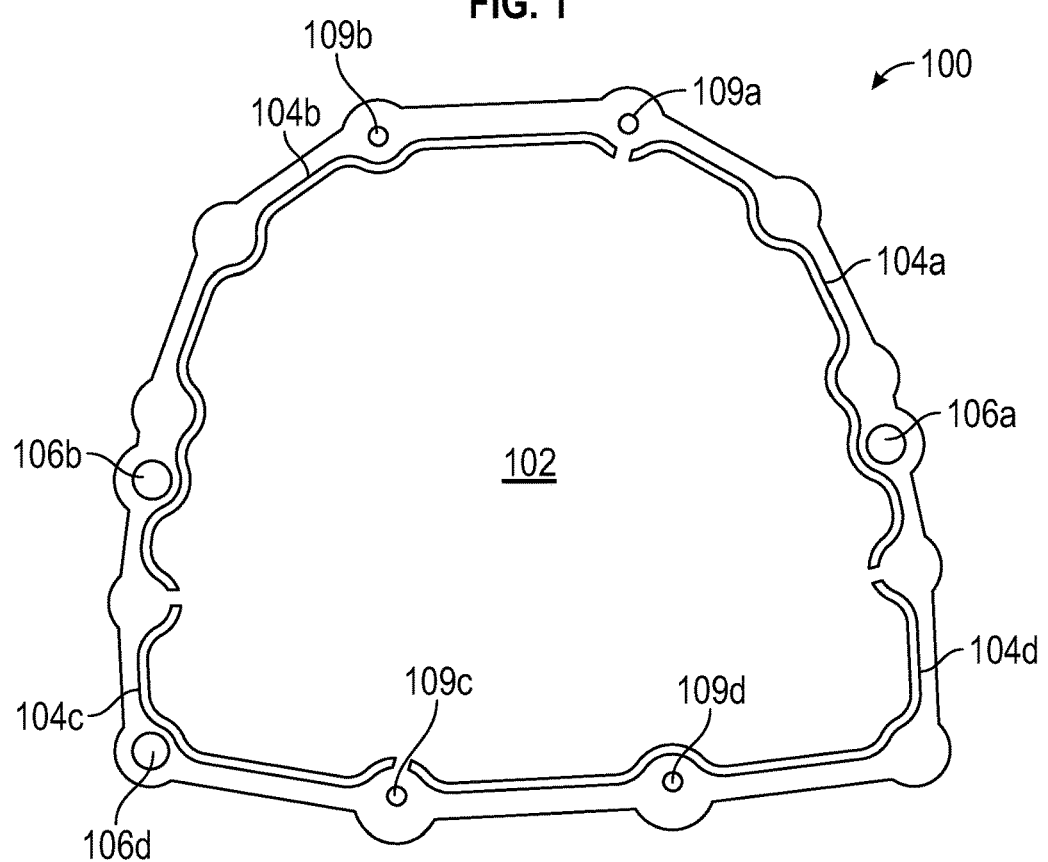
FIG. 2 is a bottom plan view of the template of FIG. 1.

As shown in FIGS. 1-2, the body of the template 100 has a top side 101, a bottom side 102, through-channels or openings 104a-d (collectively referred to herein as channel(s) 104) that extend through the template 100 from the top side 101 to the bottom side 102, and outer side walls or edges 110. The outer side walls or edges 110 include straight and curved portions; however, the outer side walls may have any geometry that would allow the template 100 to be correctly placed on the surface of the specific machine part or component. In one exemplary embodiment, the side walls 110 of the template 100 are approximately 4 mm tall. In some embodiments, the template 100 (including the side walls 110) may have different thicknesses at different parts/areas of the template 100. The template 100 in FIGS. 1-2 has a width W, a first length $L_1$, and a second length $L_2$. In one embodiment, the shape of the template 100 may be made to at least partially correspond to the surface of the specific machine part or component for which the template 100 is designed. For example, the surface of the specific machine part may have a shape similar to the shape of the template, with a width equal to the width W of the template, and first and second lengths that are equal to the first and second lengths $L_1/L_2$ of the template 100. In one exemplary embodiment, the width W is 266 mm, the first length $L_1$ is 119.5 mm, and the second length $L_2$ is 117.5 mm.

In an exemplary embodiment, the template 100 is a continuous planar article or component made from a solid material (e.g., a hard plastic). In alternate embodiments, the body of the template 100 may be configured to unfold or be made from two or more separate parts that, for example, are assembled into the full template 100. In the exemplary embodiment, the template 100 is flat on both top and bottom sides 101/102. However, depending on the shape of the specific machine part surface, it is contemplated that the entire template 100, or one or more sides of the template 100, may be non-planar, for example, stepped, curved, or a partially curved. In one alternative embodiment, the body of the template 100 may include one or more bends, curves, or steps in order to accommodate a geometry of the specific machine part and/or to help align/hold the template to the specific machine part. In one alternate embodiment, the top side 101 of the template 100 includes at least one manual or hand gripping feature (e.g., a handle).

The template 100 may have one or more labels or instructions stamped, printed, or otherwise placed on the body of the template 100. For example, the top side 101 may have a "This Side Up" label, to indicate the correct orientation of the template 100 with respect to the surface onto which the template 100 needs to be placed. Additionally, the label may include one or more of: (i) the specific part and surface of the machine that the template 100 is intended to be used on, (ii) the type(s) or specific sealing agents that may be used with the template, (iii) instructions for using the template, and (iv) a barcode or quick response (QR) code leading to any of the above or additional information.

The template 100 illustrated in FIGS. 1-2 is intended for use in a single orientation (e.g., the bottom side 102 is placed onto a surface of the specific machine before sealant is deposited into the channels 104). However, in alternate embodiments, the template 100 of the present disclosure may be configured for two-sided use. The two-sided template may be placed bottom side 102 down onto a first mating surface of the specific machine/component or, alternatively, placed top side 101 down onto a second mating surface of the specific machine/component. This may be beneficial in cases where the first mating surface is hard to reach or is positioned at a less than optimal angle (e.g., upside down). In a two-sided template, different labels/instructions may be placed/printed on the two sides of the template 100, as appropriate.

The template 100 of the present disclosure includes at least one channel 104 designed to receive a liquid, gel, or semi-liquid compound in order to form a correctly placed compound bead having a predetermined shape.

The template 100 shown in FIGS. 1 and 2 shows four channels 104a-d with four bridging portions 111 of template material formed between the end walls 105 of adjacent channels 104. It should be noted that the initial three-dimensional bead formed using the separated channels 104a-d would have gaps/spaces corresponding to the bridging portions 111 of the template 100, and would therefore not be a closed loop.

In the exemplary embodiment, the template 100 includes four channels 104a-d. However, depending on the particular design of the template 100 and/or the servicing requirements of the specific machine part, the template 100 may have a single channel or any number of channels. Each channel 104 passes completely from the top side 101 to the bottom side 102 of the template. Each channel further has two channel side walls 107 (FIGS. 3 AND 4) and two end walls 105. In the exemplary embodiment, the channels 104 are all fully closed (i.e., side walls 107 and end walls 105 are inside the template 100). However, in alternate embodiments, one or more of the channels may have an open end (e.g., one of the end walls 105 may be missing, such that the channel starts/ends at one of the outer side walls or edges 110 of the template). The channels 104 of the exemplary embodiment of the disclosure are individual, non-connected channels (e.g., channels having bridging portions 111 between them), however, in alternate embodiments, some or all of the channels may be connected to other channels and/or include branching regions.

Each channel 104 of the template 100 has a specific route or path geometry (e.g., the combination of straight, curved, and/or winding paths of the channel) and specific cross-sectional geometry (e.g., the width, depth, and shape of the channel cross sections along the route). The full shape of the channel determines/corresponds to the desired shape of the sealant bead that will be deposited using the template 100. In other words, in exemplary embodiments of the disclosure, the three-dimensional shape of the sealant bead formed via the template 100 will have the same route and cross-sections as the channel(s) 104 of the template 100. In one exemplary embodiment of the disclosure, the shape and placement/location of the sealant bead deposited using the channels 104 may be precisely controlled, for example, with a 0.5 to 2 mm tolerance.

The geometry of the channels 104 may be determined by one or more of: (i) the geometry and features of the specific machine part for which the template is produced, including the surface onto which the bead is deposited (the first mating surface) and the surface to be placed on top of the bead (the second mating surface), (ii) requirements of the seal/joint being formed using the bead, and (iii) physical and chemical properties of the compound/sealant that is to be used with the template 100 to service the specific machine part.

For example, the geometry and features of the specific machine part may require the sealant bead to be routed around various openings or protrusions (e.g., bolt holes or alignment dowels, respectively) in the first or second mating surfaces, and/or to be placed at a specific distance away from one or more edges of the first and/or second mating surfaces.

In exemplary embodiments, it may be beneficial to have greater or smaller amounts (e.g., volume) of the sealant material at different portions along the bead route in order to form a clean seal or gasket at the joint between the two mating surfaces of the machine component. For example, a proper placement and amount of each part of the bead may ensure that: (i) no excess sealant is undesirably smeared or squeezed out past certain lines (e.g., past an edge of the machine part or onto working elements of the machine part) and/or (ii) every portion of the joint has enough sealant material to create a proper seal or gasket. In some examples, it may be beneficial to have the bead maintain a predetermined distance from features/elements of a machine part (e.g., an edge, bolts, etc.) for at least a portion of its route, in order to not contaminate the machine elements.

Figure 3:
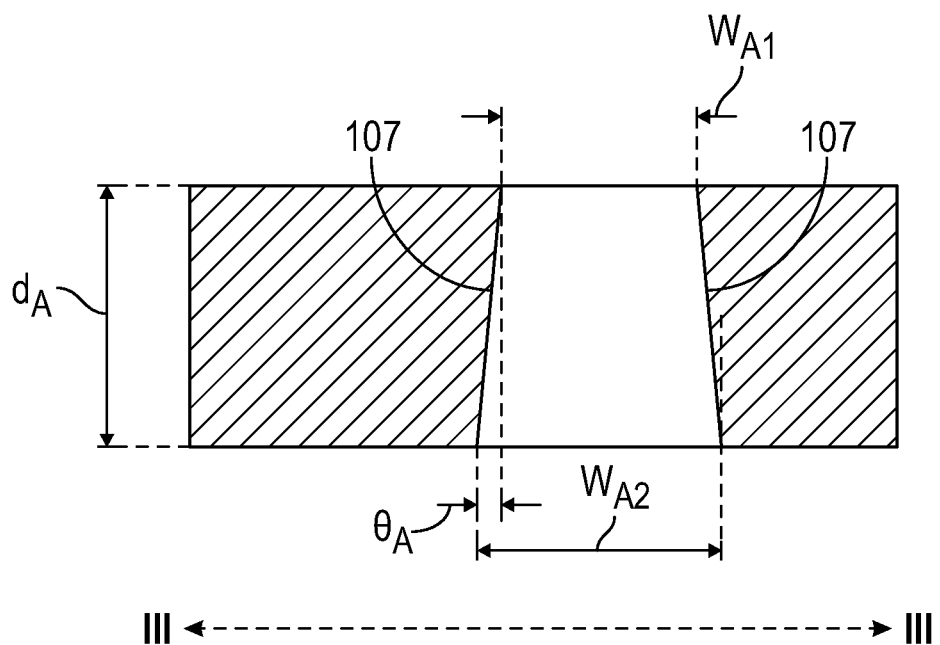
FIG. 3 is a cross sectional view of a portion of the template of FIG. 1 across the III-III cross section.
Figure 4:
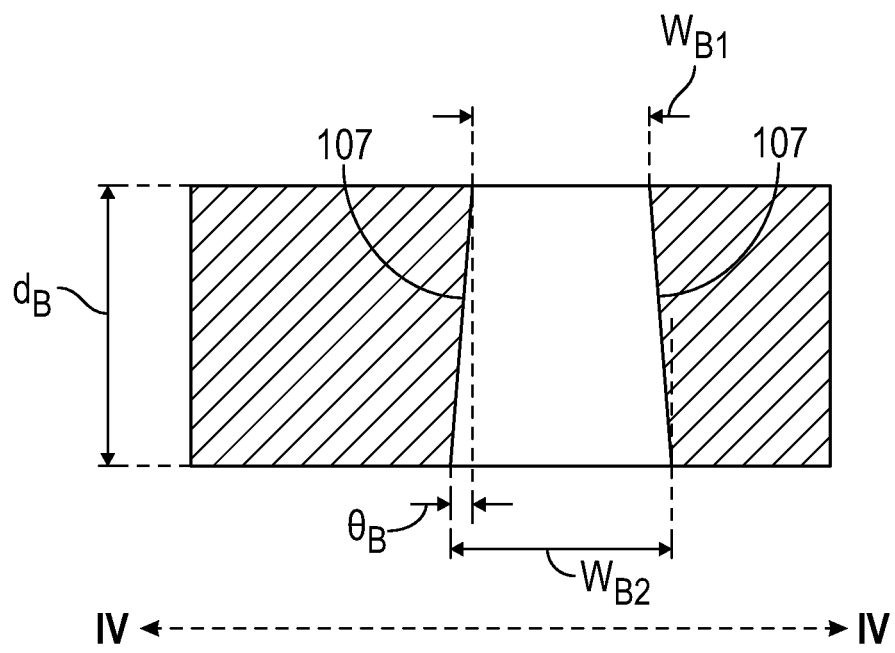
FIG. 4 is a cross sectional view of a portion of the template of FIG. 1 across the IV-IV cross section.

The physical and chemical properties of the sealant may dictate or influence the cross-sectional shape of the channels 104, examples of which are shown in FIGS. 3 and 4. For example, a sealant may have (i) higher or lower adhesive properties, (ii) higher or lower viscosity, and/or (iii) have different properties with respect to different materials (e.g., adhere more to a plastic template or a metal machine surface). One or more of these properties may influence the shape of the channels 104. For example, a particularly tacky/adhesive sealant (e.g., prone to sticking to channel walls 107) may require the channels 104 to be: (i) shallower, (ii) wider, (iii) have a lower depth to width ratio, (iv) have more tilted/angled side walls, or (v) any combination of the above, compared to channels 104 configured to receive less tacky sealant, in order to be cleanly released from the template 100. In addition, in an exemplary embodiment of the disclosure, the walls 105/107 of the channel have a smooth texture, in order to facilitate release of a sealant form the template 100.

FIGS. 3 and 4 are illustrations of cross-sections of one of the channels 104, according to an exemplary embodiment. FIG. 3 shows a cross section of channel 104 along line III-III. At that portion of the channel 104, the channel 104 may have a first depth da, a first top width $w_{A1}$, and a first bottom width $w_{A2}$. One or both of the side walls 107 of the channel 104 may have a tilt or draft angle such that the top width $w_{A1}$ is smaller than the bottom width $w_{A1}$. In one particular example, the first draft angle $\theta_A$ of both of the sidewalls is 3-5 degrees. Channel end walls (not shown in FIGS. 3-4) may be similarly tilted or angled. In some embodiment, the different walls of the channel may have different draft angles. FIG. 4 shows a cross section of the same channel 104 at a different route portion/section of the channel 104 (along line IV-IV). At the different portion, the same channel 104 has a second depth dB, a second top width $w_{B1}$, a second bottom width $w_{B2}$, and a second sidewall angle $\theta_B$.

In one illustrative embodiment, a greater amount/volume of sealant may be required at the seal formed around the area of cross section IV-IV compared to the area around cross section III-III. To accommodate this requirement, in one exemplary embodiment, the channel 104 may be configured such that the second depth de of the channel 104 is greater than the first depth da of the channel 104. Then, to ensure that the sealant material releases cleanly from the template 100 at the area around cross section IV-IV, other channel parameters might be adjusted to compensate for the change (e.g., greater channel width(s) to keep the depth/width ratio the same or greater sidewall angle).

The template 100 of the present disclosure may be designed such that individual parameters (e.g., top width, bottom width, depth, draft angle) at various points along the path of each channel 104 are set/designed in order to accommodate the requirements of the seal for which the template 100 is made. In some exemplary embodiment, one or more of the channels 104 may have a continuously or discontinuously changing cross-sectional shape along the length of the channel, in order to accommodate requirements of the seal or gasket being formed, the geometry of the machine part surface, and/or the properties of the sealant. In other embodiments of the disclosure, a channel 104 may have the same cross-sectional geometry at all or some portions of the channel, still consistent with the requirements of the seal or gasket, machine part surface, and sealant properties.

In the exemplary embodiment, the template 100 has one or more alignment features 106. The alignment features 106 shown in FIGS. 1 and 2 are openings made to correspond to protrusions (e.g., bolts or dowels) of the specific machine part for which the template is made. The protrusions of the specific machine part may be present on the machine part, as part of its integral structure, or may be permanently or temporarily inserted or otherwise attached to the machine part for the application and/or alignment of the template. It should be understood that alignment features 106 may be any type of alignment features, as long as they correspond to features of the specific machine part. For example, alignment feature may include one or more of: openings, indents, grooves, slots, and protrusions having various shapes. In some embodiments, the template 100 may have one or more bent sections (as discussed briefly above with respect to the template 100 body) that may help anchor and/or align the template 100 to a corner or edge of the specific machine part. For example, one or more sections of the template 100 may extend at 90 degrees from the bottom side of the main body of the template 100 in order be set against a straight corner of the specific machine part. In some embodiments, the shape and location of the outer side walls 110 of the template 100 can be used to approximately align it to the specific machine part. For example, sidewalls of the template 100 shown in FIGS. 1 and 2 have straight and curved portions that may match to straight and curved portions of the specific machine part. A technician could use those matching features to correctly place the template over the specific machine part. It is also contemplated that the template 100 might have no alignment features, in which case, the technician would have to approximate the correct placement of the template.

In some embodiments, the template 100 may also have one or more retention features configured to keep the template 100 steady and in place on the specific machine part as sealant is applied. The template 100, as illustrated in FIGS. 1 and 2, includes front side magnets 108a-d (referred to collectively herein as front side magnet(s) 108) on the front side 101 and back side magnets 109a-d (referred to collectively as back side magnet(s) 109) on the back side 102 that may act as retention features for the template 100 once it is placed on a metal (or, more specifically, ferromagnetic) surface. As the bottom side 102 of the template 100 is placed onto a metal surface of the specific machine part, the front and back side magnets 108/109 help keep the template 100 in place while it is being used. While the above figures show four front side magnets 108 and four back side magnets 109, it should be understood that any number of top side and bottoms side magnets 108/109 may be used. The retention features may allow for the template 100 to be held in place on a non-horizontal surface, which may be necessary or desirable if the machine surface is non-horizontal and is too large and/or heavy to be rotated. In some embodiments, depending on the type and viscosity of the sealant, the retention features may allow the template 100 to be used on an inclined surface, a vertical surface, an upside-down surface or a negatively inclined surface. Alternatively, or additionally, the template 100 may include one or more other types of retention features, for example, tape, temporary glue, clips, fasteners, etc. In one alternate embodiment, it is contemplated that no retention features are used, so that the technician would be required to manually hold the template 100 in place on the machine surface.

In an alternate embodiment, one or more portions/sections of the channels 104 may be specifically designed to be wider than the desired width of the sealant bead, so that a technician would have to at least partially hand guide the sealant bead through the purposely wider (e.g., pocket or lateral recess) sections of the channel. As a result, the bead may (i) fully conform to channel side walls 107 at some (normal) channel sections and (ii) not touch or not fully touch one or both of the channel side walls 107 at the other (pocket) sections of the channels 104. A sealant bead deposited into such channels would not have continuous contact with the entirety of channel side walls 107, and thus may be more easily released from the template 100.

Figure 5:
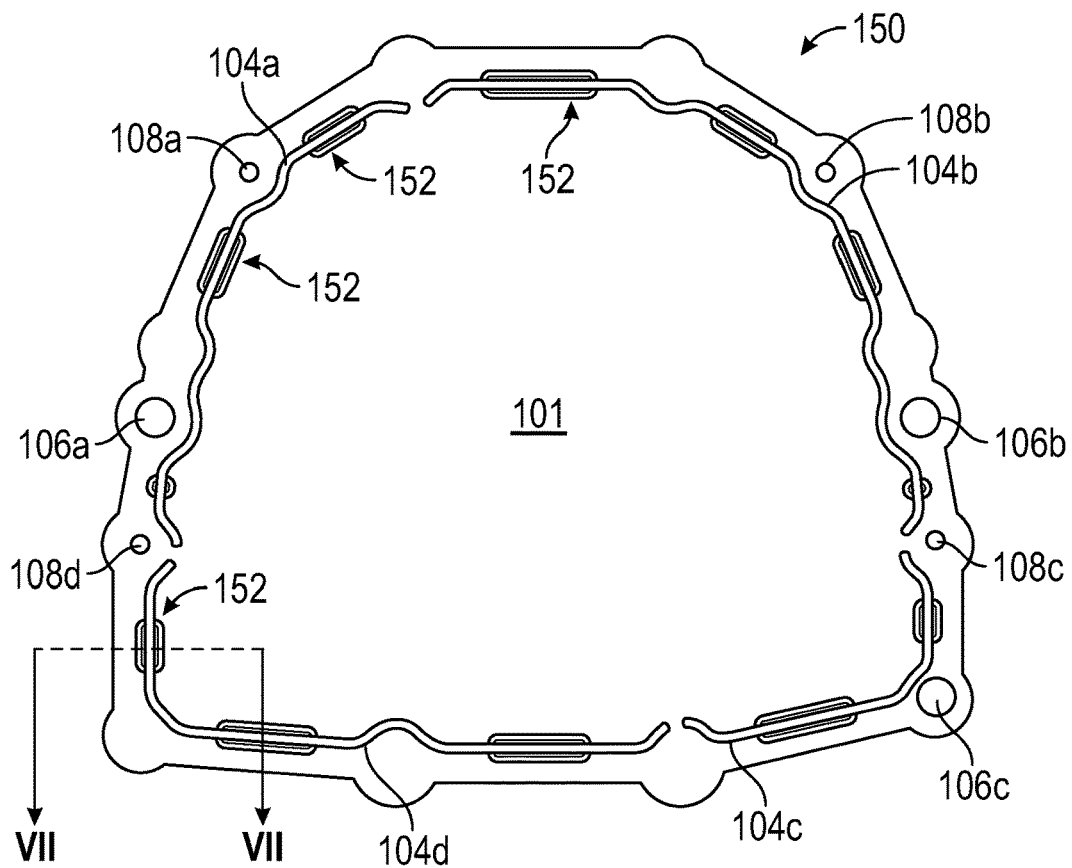
FIG. 5 is a top plan view of a template, according to another exemplary embodiment.
Figure 6:
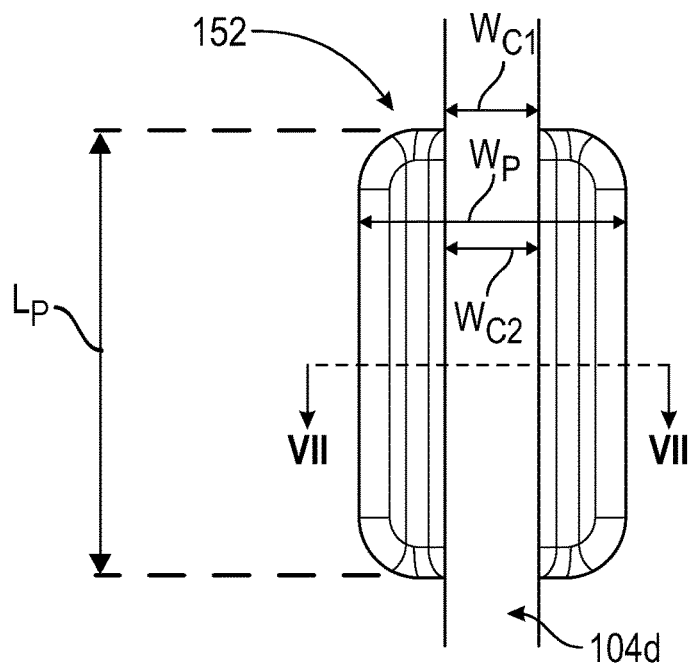
FIG. 6 is a top plan close-up view of the template of FIG. 5.
Figure 7:
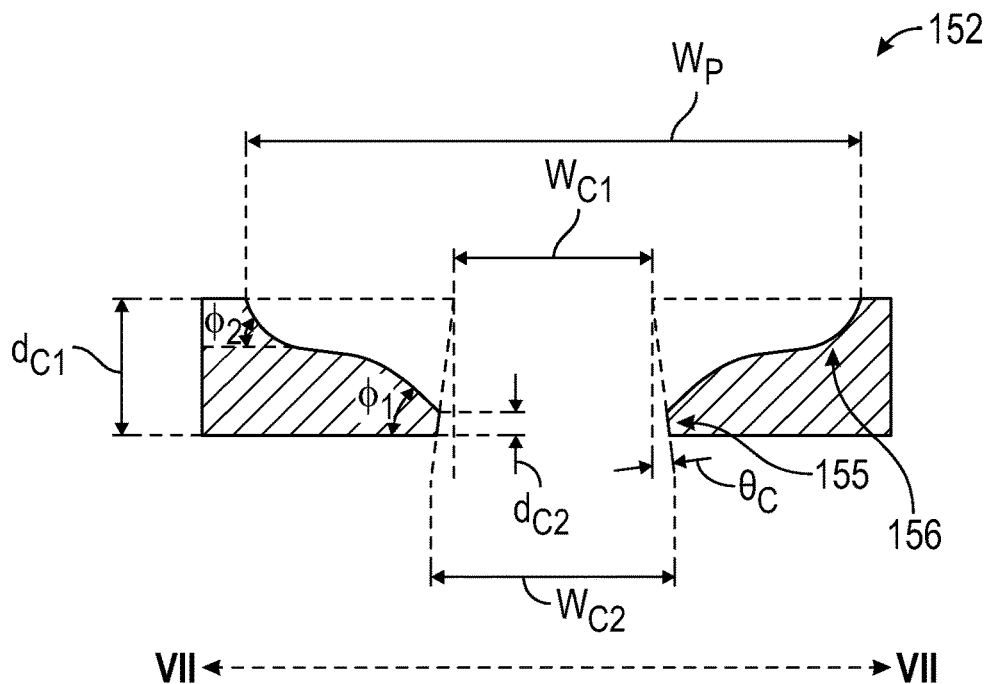
FIG. 7 is a cross sectional view of the template of FIGS. 5-6 across the VII-VII cross section.

FIGS. 5-7 show one exemplary embodiment of a template 150 with pocket sections 152 disposed along the lengths of the channels 104. Various features and properties of the template 100 described with respect to FIG. 1 may correspond to features and properties of the template 150 shown in FIGS. 5-7.

FIG. 5 shows a top plan view of the template 150 having pocket or lateral recess sections 152 of the channels 104. In an embodiment, as shown in FIG. 5, the pockets sections 152 may have different lengths to, for example, correspond to uninterrupted straight portions of a channel 104 (e.g., the three pockets 152 along the bottom edge of the template 150 as shown in FIG. 5). In other embodiments, the pocket sections of the channels 104 may all be the same lengths and/or may not correspond to the uninterrupted straight sections of the channels 104.

FIG. 5 shows pocket sections 152 periodically spaced along the route of the channels 104, however, the channels 104 could be designed to have pocket sections 152 at more irregular intervals (e.g., only at parts of the channel where channel geometry makes sealant material harder to release from the template or at parts of the channel where there is enough space to place the wider pocket sections). In various embodiments, greater or smaller numbers of pocket sections 152 than shown in FIG. 5 may be formed along channel 104 routes.

FIG. 6 is a top close-up view of a pocket or recess section 152 in a channel 104d of the template of 150. The pocket 152 has a pocket length $L_P$ and a pocket width $W_P$ that is wider than the regular top width $W_{C1}$ of the channel 104d in that area of the channel. FIG. 6 shows an abrupt (stepped) transition from a regular channel section of the channel 104d to the pocket section 152, and rounded corners for the pocket itself. However, other combination of sharp and/or round transitions may be used. In various embodiments, transitions from regular channel sections to the pocket sections may be stepped (e.g., one or both channel side walls 107 would have a stepped portion), smooth (e.g., gradual or semi-gradual transitions of the side walls 107 into the wider sections), or a combination of the two.

FIG. 7 is a cross sectional view of the pocket section 152 of the channel 104d across the VII-VII cross section (shown in FIGS. 5-6). The pocket section 152 of the channel 140d may have a first depth $d_{C1}$ and a second depth $d_{C2}$, and channel side walls of the pocket 152 may have lower sidewalls 155 and upper pocket sidewalls 156. The lower sidewalls 155 may correspond to bottom parts of sidewalls 107 from a normal section of the channel 104d (similar to those shown in FIGS. 3-4), with a draft angle $\theta_C$ of around 3-5 degrees. Similarly, a bottom width $W_{C2}$ of the pocket section 152 may correspond to the bottom widths of normal channel sections (e.g., $W_{A2}$ and $W_{B2}$ in FIGS. 3-4). In some embodiments, the lower sidewalls 155 may not be included in the pocket sections 152 (e.g., the pocket sidewalls 156 start immediately at the bottom of the channel).

However, as can be seen in FIG. 7, the top portion of the channel are missing so as to form the laterally recessed pocket side walls 156. The draft angle $\theta_C$ of the bottom sidewalls 155, starting from the bottom edges of the pocket section 152, leads to a corresponding top width $W_{C1}$ of the channel 104 just outside the pocket section 152 (as may be seen in FIG. 6). In an embodiment of the disclosure, the actual top width of the pocket section $W_P$ is substantially larger than the top width $W_{C1}$ of the normal sections of the surrounding channel (e.g., pocket top width $W_P$ is 9 mm while normal channel top width $W_{C1}$ is 3 mm).

In some embodiments, a recessed pocket side wall 156 may have an irregular curved shape, including a slope having several different angles (e.g., $\phi 1$ and $\phi 2$, as shown in FIG. 7). In one example, an initial slope $\phi 1$ of the pocket sidewall is 45 degrees. In various other embodiments, one or both of the pocket side walls 156 may (i) be flat with a single slope, (ii) include two or more flat or curved sections having different slopes, (iii) be concave (e.g., as if an arc has been cut from the top of the channel), or (iii) have a combination of the above features. In one alternate embodiment, the pockets 152 may have a single pocket width $W_P$ spanning from the bottom to the top parts of the pockets, such that the bottom side walls 155 would not exist and the pocket side walls 156 would be vertical.

In some embodiments of the disclosure, a pocket section 152 of a channel 104 may receive a portion of sealant material (e.g., as the bead is being deposited along the channel route) only in the bottom part of the pocket section 152. In other words, the sealant material would be deposited to conform to the bottom width $W_{C2}$ and bottom sidewalls 155 of the pocket 152, but would not contact or fill the rest of the pocket 152. In one embodiment of the disclosure, pocket sections 152 of channels 104 of the template 150 may be configured to have a sealant bead (i) conform to the bottom parts of the pockets 152 and (ii) partially rise above the height of the bottom sidewalls 155 (e.g., a top, rounded part of the bead may tower vertically over the bottom sidewalls 155, but not touch the pocket side walls 156).

As noted earlier in the disclosure, the wider pocket/lateral recess sections of the channels may allow a sealant bead deposited into the channels to more easily release from the template. The bead sections deposited into the pockets would not adhere to channel walls as the template is being lifted and would, additionally, help pull/keep down the sections of the bead (e.g., in the normal sections of the channels) that do stick to the template.

Figure 8:
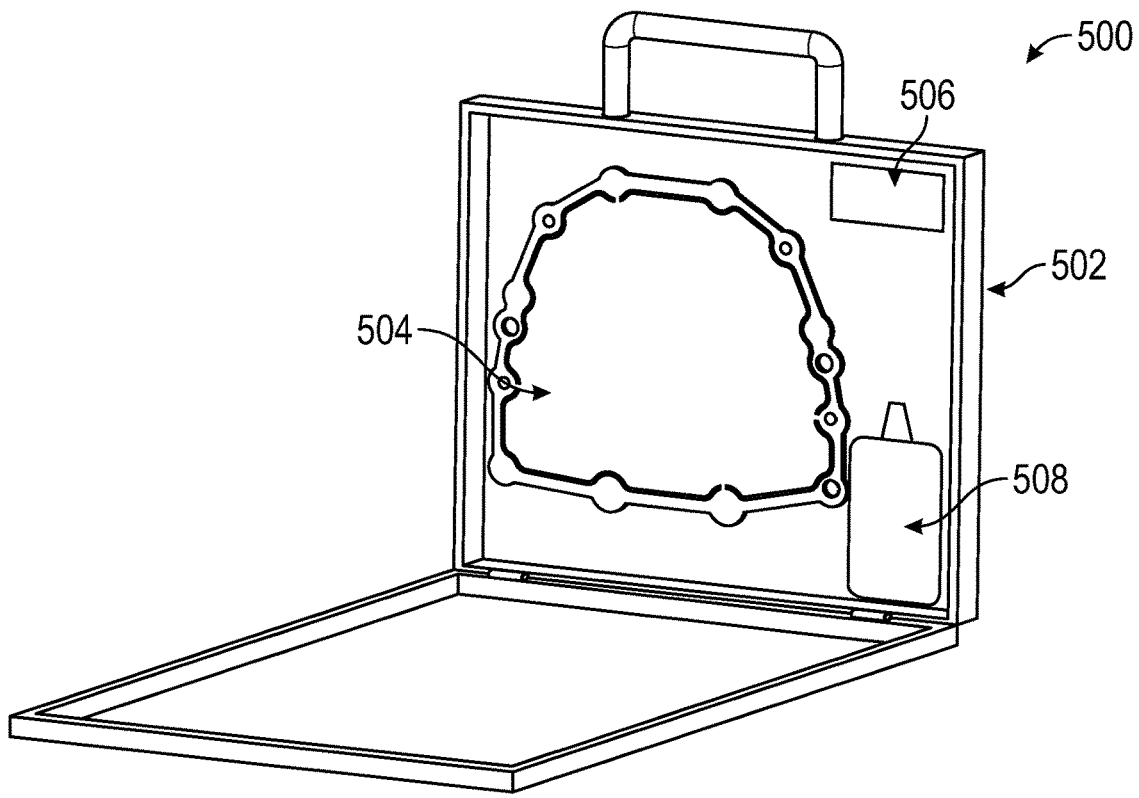
FIG. 8 is an illustration of a field repair kit, according to an embodiment.
Figure 9:
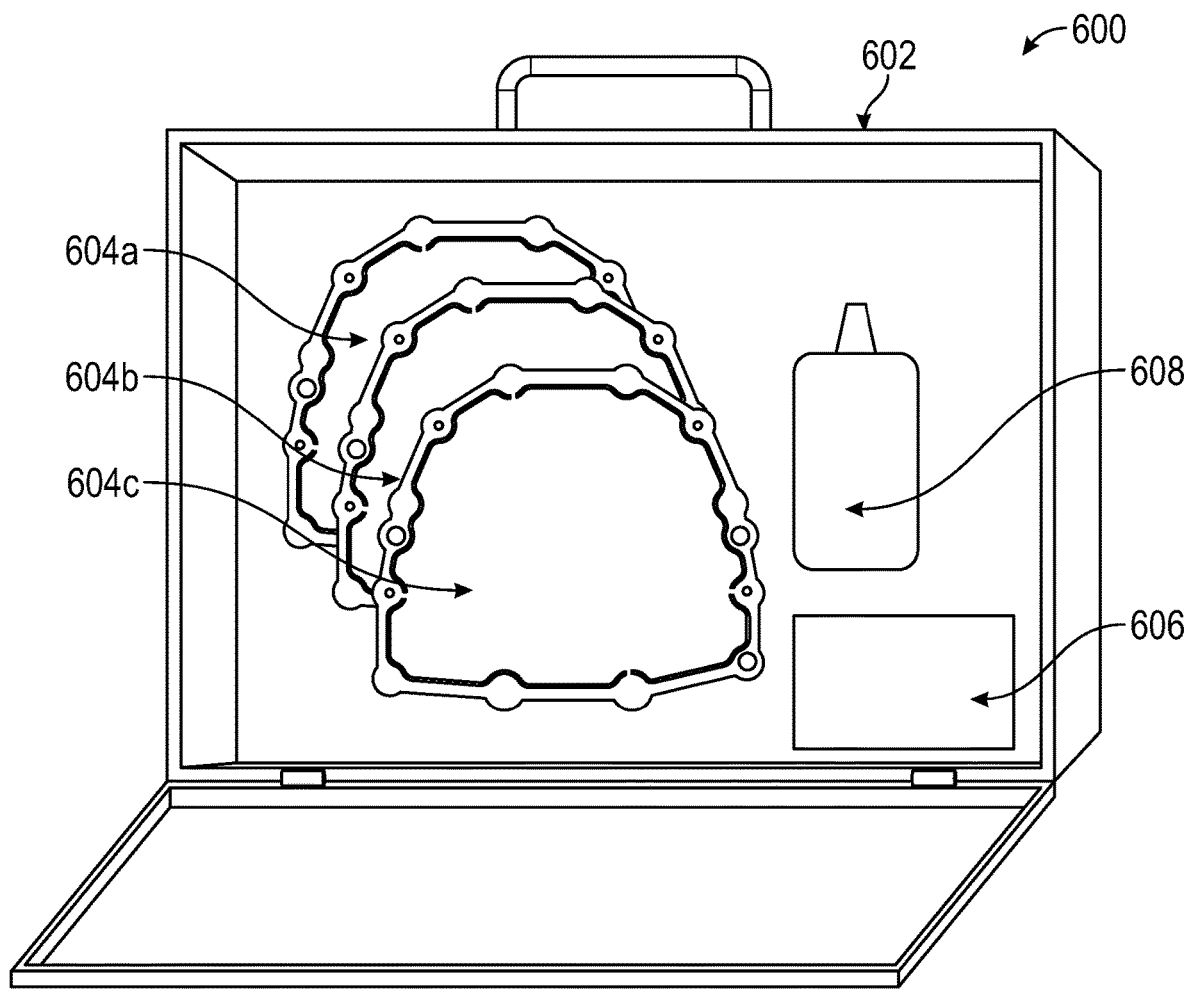
FIG. 9 is an illustration of a field repair kit, according to another embodiment.

FIGS. 8 and 9 illustrate field repair kits, according to exemplary embodiments of the disclosure.

In one exemplary embodiment, FIG. 8 shows a field repair kit 500 including a container 502 and a sealant template 504 similar to or identical to template 100. The field repair kit 500 is designed for servicing a specific machine part. The template 504 is designed to help deposit a precisely shaped sealant bead onto a surface of the specific machine part, as described with respect to FIGS. 1-7 above.

In an exemplary embodiment, the kit container 502 also includes a sealant 508 preselected for servicing the specific machine part (e.g., preselected for a particular machine joint) and compatible with the template 504. The template 504 may be designed to be used with one or more preselected sealants or one or more specific types of sealants. In an exemplary embodiment, the sealant 508 included with the template 504 in the field repair kit 500 is one of the specific sealants. The sealant 508 may be held in its own container, for example, a tube, cartridge, bottle, pail, can, and so on.

In exemplary embodiments of the disclosure, the sealant 508 comprises a liquid, gel, or semi-liquid sealing compound or adhesive that may be deposited into template channels to create seals and/or gaskets for machine parts, as described in other parts of the disclosure. In one embodiment, a room temperature vulcanizing (RTV) sealant is used. In some embodiments, a form in place (FIP) gasket that is deposited as a liquid or semi-liquid compound may be used. In other embodiments, an anaerobic sealant, adhesive, or gasket-maker may be used.

The container 502 may be any type of container suitable for holding the template 504 and the sealant 508 (if the sealant 508 is included). For example, a box, a bag, a case, a toolbox, and so on, may be used, according to various embodiments. In some embodiments, the container includes one or more mechanism/articles for holding the template 504 and sealant 508 in place (e.g., shaped cutouts, pockets, bands, etc.).

The field repair kit 500 may also include one or more labels or instructions, for example, printed or attached onto the kit container 502 or included inside the container 502. The label or instructions may include one or more of: (i) the specific part of the machine the kit is intended to be used on, (ii) instructions for using the template 504, and (iii) a barcode or quick response (QR) code leading to any of the above and/or additional information.

In some embodiments, one or more other articles useful for field repair may be included in the field repair kit 500. For example, a squeegee knife, gloves, and/or wipes may be optionally included in the field repair kit 500.

In another exemplary embodiment, FIG. 9 shows a field repair kit 600 that is similar to the field repair kit 500 described with respect to FIG. 8. The field repair kit 600 includes a container 602 and a label or instructions 606, similar to the container 502 and instructions 506 described with respect to FIG. 8 above.

However, unlike the field repair kit 500 of FIG. 8, the field repair kit 600 of FIG. 9 includes multiple different sealant templates 604a-c (collectively referred to as sealant template(s) 604). As an example, each of the templates 604 may be designed for a different machine part or a different mating surface of the same machine part. For example, in one embodiment, the field repair kit 600 is designed to service a particular engine and the individual templates 604 are configured to create seals or gaskets at different parts of the engine. Although three templates are shown in FIG. 9, a smaller or greater number of templates may be included in a single kit. A single sealant 608 may be included in the kit 600 if, for example, the sealant 608 is compatible with every template 604a-d in the kit 600. Alternatively, multiple sealants may be included in the field repair kit 600 if some of the templates 604 require different sealing compounds. In one particular embodiment, a field repair kit 600 of FIG. 9 includes a plurality of the smaller field repair kits 500, as described with respect to FIG. 8.

For clarity and ease of explanation, some surfaces and details may be omitted in the present description and figures. In addition, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

It should be understood that the various components illustrated herein are not necessarily drawn to scale. In other words, the features disclosed in various embodiments may be implemented using different relative dimensions within and between components than those illustrated in the drawings.

INDUSTRIAL APPLICABILITY

Embodiments of the present disclosure relate to the controlled deposition of a specifically shaped, three-dimensional sealing bead onto a surface of a machine part, and to creating a machine part joint using the deposited sealing bead. The following examples illustrate a specific engine block and a front housing that connects to the engine block, however, it should be understood that the current disclosure may be applied to any machine or appliance part, component, or system that requires the creation of a seal, joint, or gasket via an application of a liquid or semi-liquid compound in a specific geometry.

Figure 10:
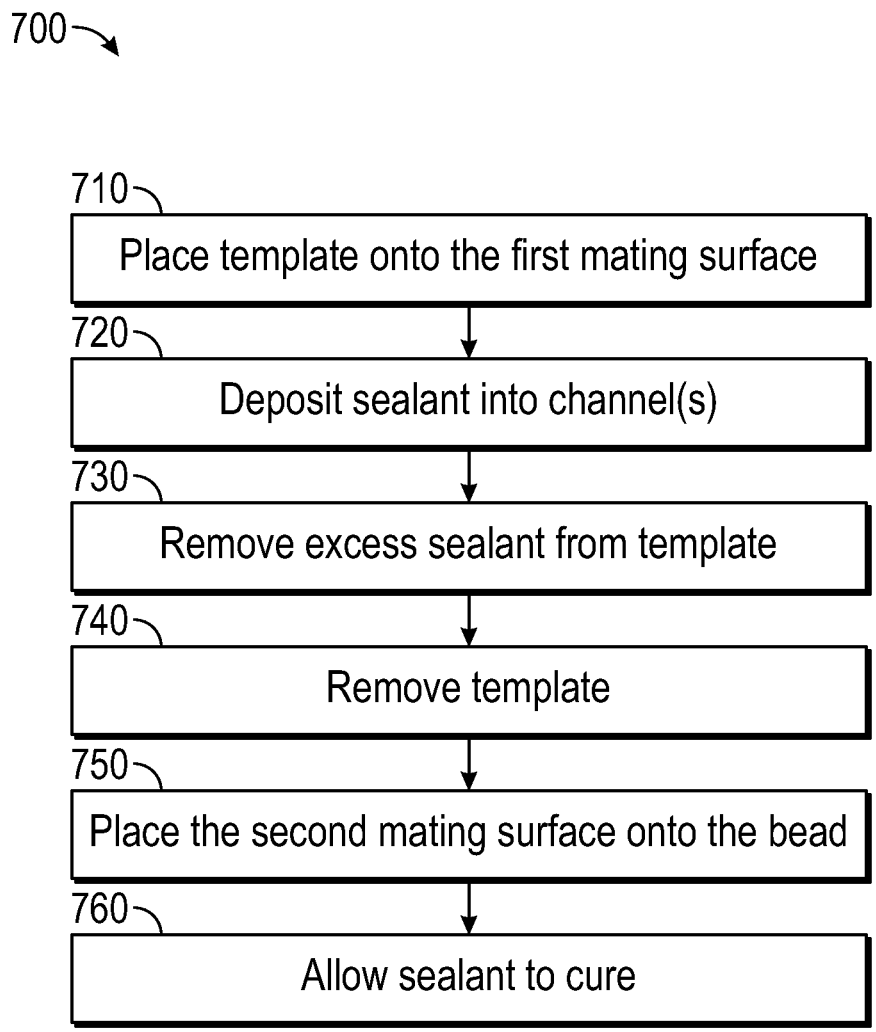
FIG. 10 is a flowchart of a process of providing a seal between machine parts using a template, according to an exemplary embodiment.
Figure 12:
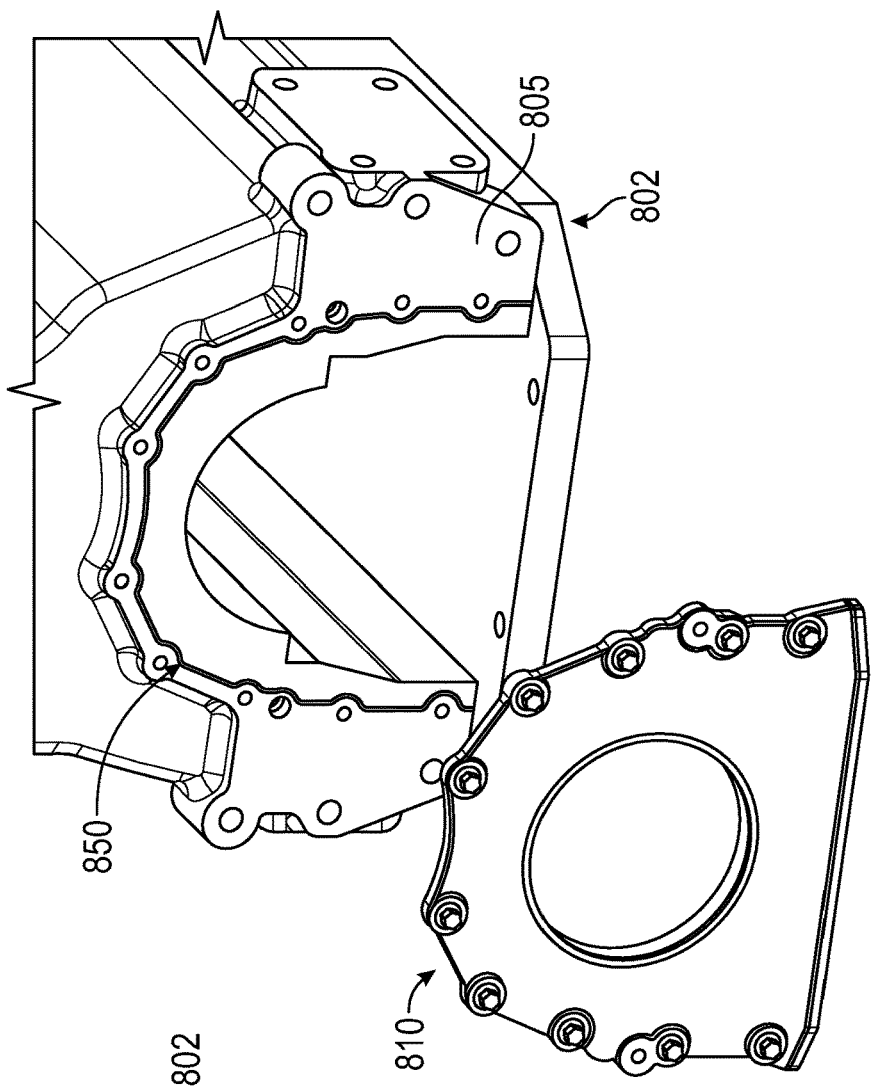
FIGS. 11-14 show the process of FIG. 10 applied to an engine block and front housing, according to an exemplary embodiment.
Figure 11:
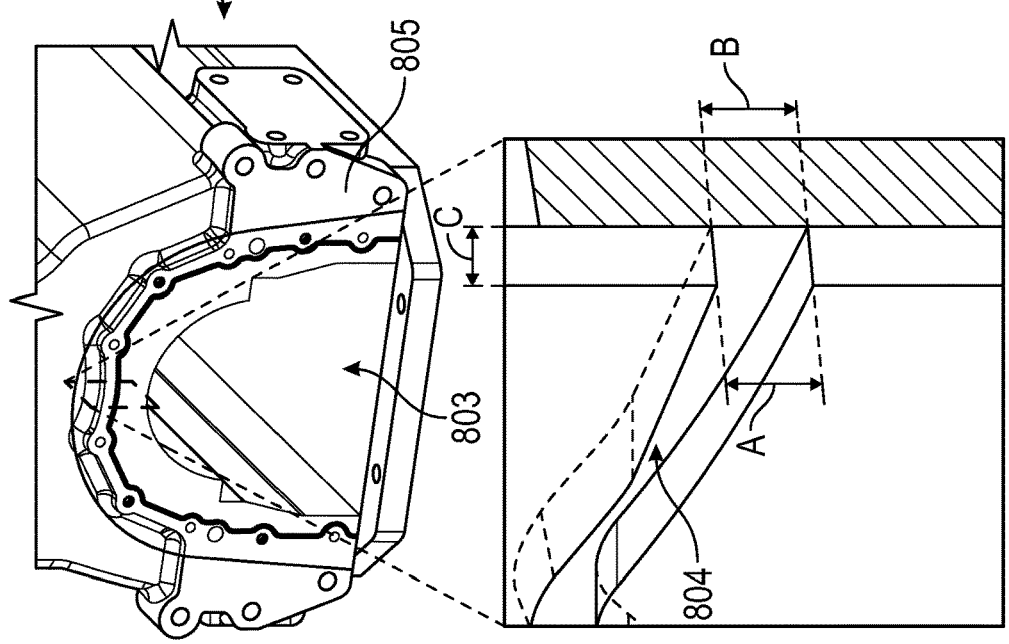
Figure 13:
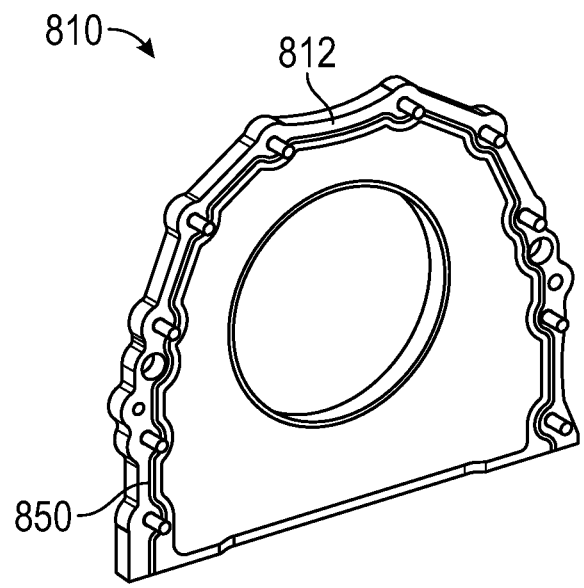

FIG. 10 is a flow chart of a process 700 of providing a seal or gasket at a joint of an engine using a sealant template or guide, according to embodiments of the present disclosure. FIGS. 11-13 show different states of the process 700. The process 700 may be performed in a field setting, using the template described with respect to FIGS. 1-7. In addition, the template may be part of a field repair kit, as described with respect to FIGS. 8-9.

At step 710 of the process 700, as illustrated in FIG. 11, a template 803 is placed onto a surface 805 of an engine block 802. Before placing the template 803, a technician may need to do one or more of the following: (i) select the appropriate template from a set of templates in a repair kit, by e.g., relying on labels or instructions printed or otherwise disposed on the template and/or kit, and remove the appropriate template from the repair kit (ii) make sure the surface 805 of the engine block 802 is clean, (iii) attach retention features to the template or the surface 805, if appropriate (e.g., attach double sided tape), and (iii) align and correctly orient the template with respect to the engine block 802 (e.g., by using a "this side up" label on the template and/or one or more alignment features of the template 803). Once the template 803 is placed, one or more retention features may help hold it in place. For example, one or more magnets may hold the template 803 to the surface 805 of the engine block 802.

As shown in FIG. 8 and discussed earlier in the specification with respect to FIGS. 1-7, a cross-sectional channel 804 of the template 803 may have a top width A, a bottom width B, and a depth C; and the shape, volume, and dimensions of the channel may depend on various parameters, including but not limited to machine joint requirements and sealant properties. FIG. 11 illustrates a template 803 with a channel routed around various features (pins, holes, etc.) of the engine block 802 and front housing 810. The route of the channel also ensures that the sealant bead does not flow off (e.g., is not squeezed out past) the edge of either surface 805/812.

It should be noted that the surface 805 of the engine block 802 is much wider than its counterpart mating surface 812 (located on the front housing 810). Thus, a technician applying a sealant bead onto the engine block 802 without a template may accidentally route the sealing bead to an area of the engine block surface 805 that will not actually receive the counterpart mating surface 812 of the front housing. This would lead to a portion of the bead not being able to form a proper seal. Conversely, the template 803 of the current disclosure would ensure that the sealant bead is (i) optimally routed in areas where the two mating surfaces meet and (ii) has the desired volume of sealant at various parts of its route.

At step 720 of the process 700, liquid or semi-liquid sealing compound is deposited into the channel or channels of the template. In one embodiment, the sealing compound is an RTV compound. In another embodiment, the sealing compound is an anaerobic sealant. In some embodiment, step 720 also requires selecting and obtaining the appropriate sealing compound. In an exemplary embodiment, a technician uses a sealant provided in a field repair kit designed specifically for the current service job, as described elsewhere in the disclosure. The sealing compound may be provided in a sealant container (e.g., a tube) with a nozzle/applicator and be, for example, squeezed out or otherwise extruded from the sealant container by a technician into the channel(s) using the applicator. In an alternate embodiment, the sealing compound may be provided in a container without a convenient applicator (e.g., in a pail) and would have to be scooped up and deposited into the channel(s) with a putty knife or other such instrument. The channel(s) of template 803 ensure that the sealing compound is deposited onto the surface 805 in correct amounts and on the properly placed path, regardless of the type of sealant container and/or sealant applicator available to the technician. For example, if a nozzle of a tube containing the sealing compound is too narrow for certain parts of the channel route, the technician could keep squeezing the tube in place until that part of the channel fills up. If the nozzle (or other applicator) is too wide, the technician could deposit the sealing compound into the channel(s) and wipe off the excess (as described in the next step 730).

At step 730 of the process 700, excess sealing material is removed from the top of the template, including the tops of the channel(s), to ensure that the deposited sealing compound corresponds to the shape and size of the template channel(s) 804. The technician may use this step to make sure that the channel(s) are completely filled in and level with the top of the template and, if needed, to scoop or scrape some of the excess sealing compound from the top of the template into the channels. The above step 730 may be performed using any appropriate flat object or scraping device (e.g., a putty knife, a squeegee, a plastic card, etc.).

At step 740 of the process 700, the template 803 is removed from the surface 805 of the engine block 802, leaving behind a bead 850 (or multiple beads) of sealing material. In some embodiments, depending on the properties of the sealing compound, step 740 may additionally include giving the sealing compound time to set or 'skin' before removing the template. In other embodiments, the sealing compound may require removal of the template immediately after deposition of the sealing compound. In yet other embodiments, the bead 850 material may require some time to set or skin after removal of the template but before applying the mating surface. FIG. 10 shows the engine block 802 with the deposited bead 850 on the front surface 805 of the engine block 802 and, separately, the front housing 810 that will be joined to the engine block 802 via the bead 850. As illustrated in FIG. 12, the bead 850 may have a three-dimensional shape (including path/placement, thickness, width, and volume) that exactly corresponds to the shape of the channel(s) 804 of the template 803. Thus, the shape of the bead 850 formed using the process 700 can be precisely controlled to have placement and volume optimized for the joint between the engine block 802 and the front housing 810. In the exemplary embodiment, the bead 850 placement corresponds to a required and predetermined bead placement within a 0.5 to 2 mm tolerance. In an alternate embodiment, as discussed with respect to FIGS. 5-7, one or more sections of the bead 850 (e.g., deposited into pocket sections of the channels) may not have full contact with the side walls of the channel(s) 804.

FIGS. 11-12 show an embodiment of the process 700 where the template 803 is placed on the engine block 802, such that a bead 850 is formed on the surface 805 of the engine block 802 (FIG. 11). The front housing 810 (with no sealant bead) is then pressed to the engine block 802 (FIG. 12).

FIG. 13 shows an alternate embodiment, where the template 803 was placed onto a surface 812 of the front housing 810, instead of the engine block 802, and a sealant bead 850 was formed on the front housing surface 812 via the template 803. In some embodiments, the template 803 may be designed to be specifically placed only on the engine block 802 or only on the front housing 810. In another embodiment, the template 803 may be two-sided, designed to be used on either the engine block 802 or the front housing 810.

Figure 14:
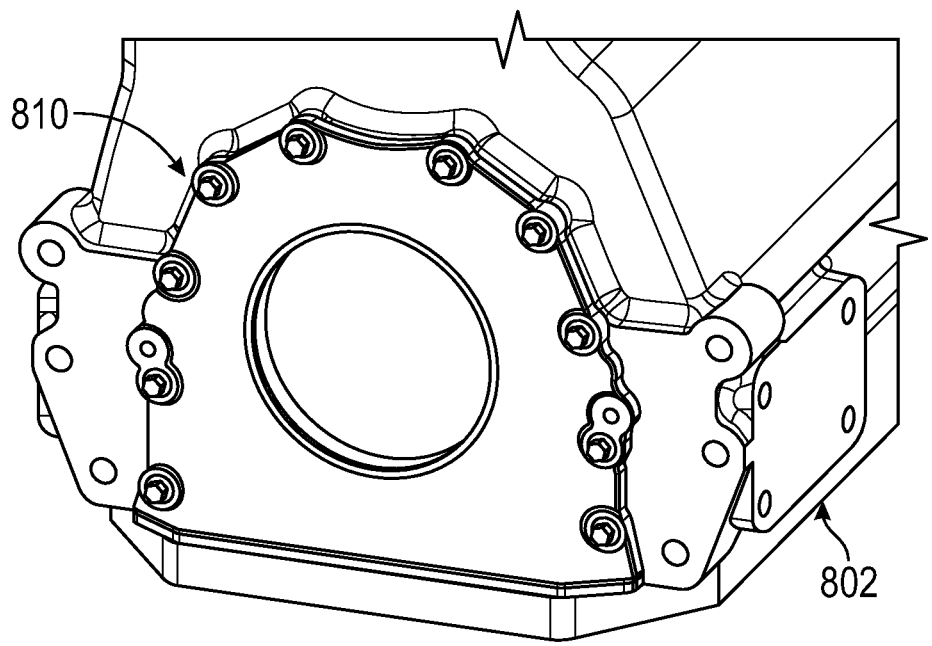

At step 750 of the process 700, the mating surface 812 of the front housing 810 is joined to the surface 805 of the engine block 802 via the bead 850 of sealing material. In an exemplary embodiment of the disclosure, the mating surface 812 of the front housing 810 is pressed firmly into the engine block, such that the bead 850 is compressed (and, consequently, expands outwards along the plane of the joint). This deformation of the bead 850 allows any gaps between separate sections of the bead to be filled and, optionally, for air within the sealing compound to be squeezed out. The now compressed/deformed bead 850 of sealing material creates a closed, continuous shape for the seal or gasket at the engine block/front housing joint. FIG. 14 shows the assembled engine block 802 and front housing 810. Step 750 may additionally include one or both of: (i) cleaning the mating surface 812 of the front housing before joining it onto the engine block 802, and (ii) adding and tightening any required fasteners (e.g., crews, bolts, etc.) to hold the engine block 802 and the front housing 810 together.

At step 760, the sealing material of the bead 850 may be allowed to cure in order to create the seal or gasket at the joint. In some embodiments, the sealing material cures with time only (e.g., RTV silicone). In other embodiments, a lack of air/oxygen and a presence of metal surfaces 805/812 may facilitate the curing process (e.g., for anaerobic sealants).

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of engine or engine block. Hence, although the present embodiments are, for convenience of explanation, depicted and described as being implemented on a particular engine block, it will be appreciated that it can be implemented in various other types of machines, machine parts, or even non-machine parts that require a particularly seal or gasket. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method of forming a seal between a first mating surface and a second mating surface, wherein the first mating surface is included in a machine part, wherein the machine part is a part of an engine, the method comprising:
    positioning a template onto the first mating surface, the template having at least one opening;
    depositing a sealing material into the at least one opening to create a three-dimensional bead of the sealing material in a first configuration corresponding to a three-dimensional shape of the opening, the sealing material being deposited while the template is positioned on the first mating surface of the machine part;
    removing the template from the first mating surface, wherein removing the template leaves behind the bead of the sealing material on the first mating surface;
    before curing the bead of sealing material, positioning the second mating surface onto and in contact with the bead, and
    curing the bead of sealing material.

2. The method of claim 1, wherein the template is a continuous article made from a solid material.

3. The method of claim 2, wherein the opening includes one or more sidewalls, and at least one of the sidewalls is tilted so as to form a draft angle.

4. The method of claim 1, wherein positioning the template onto the first mating surface comprises: using at least one alignment feature of the template to align the template with at least one feature of the first mating surface.

5. The method of claim 4, wherein the at least one alignment feature comprises one or more alignment holes in the template.

6. The method of claim 1, wherein the first mating surface is a non-horizontal surface and wherein positioning the template onto the first mating surface comprises using at least one retention feature of the template to hold the template to the first mating surface.

7. The method of claim 1, wherein the at least one opening forms a channel having opposing side walls that follow a winding path of the channel.

8. The method of claim 1, further comprising after the depositing the sealing material into the at least one opening, removing excess sealing material further comprises from a top surface of the template, including leveling the sealing material in the at least one opening with the top surface of the template.

9. The method of claim 1, further comprising, after positioning the second mating surface: moving the first and second mating surfaces towards each other to deform the bead into a second configuration of the sealing material.

10. The method of claim 9, wherein the second configuration of the sealing material forms a continuous closed shape.

11. The method of claim 10, wherein the first configuration of the sealing material forms an open shape having at least one gap.

12. The method of claim 1, wherein the at least one opening is formed as a channel having a continuous length extending through the template from an open top side of the channel to an open bottom side of the channel, the open top side and the open bottom side each extending continuously along a length of the at least one opening.

13. A method of forming a seal between a first mating surface and a second mating surface while in a field environment, wherein the first mating surface is included in a machine part, the method comprising:
    positioning a template onto the first mating surface while in the field enviroment, the template comprising a continuous article made from a solid material having at least one opening;
    depositing a sealing material into the at least one opening to create a three-dimensional bead of the sealing material in a first configuration corresponding to a three-dimensional shape of the opening, wherein depositing the sealing material causes the sealing material to enter a channel of the template;
    removing the template from the first mating surface, wherein removing the template leaves behind the bead of the sealing material on the first mating surface; and
    positioning the second mating surface onto and in contact with the bead.

14. The method of claim 13, further comprising: after the depositing the sealing material into the at least one opening, removing excess sealing material from a top surface of the template.

15. The method of claim 14, wherein positioning the second mating surface onto and in contact with the bead occurs before the curing of the bead of sealing material.

16. The method of claim 13, wherein positioning the template onto the first mating surface comprises: using at least one alignment feature of the template to align the template with at least one feature of the first mating surface.

17. The method of claim 13, wherein at least one of the side walls of the channel has a tilt that forms a draft angle.

18. A method of forming a seal between a first mating surface and a second mating surface, wherein the first mating surface is included in a machine part, the method comprising:
- positioning a template onto the first mating surface while outside of a factory, the template comprising a continuous article made from a solid material and having at least one opening;
- depositing a sealing material into the at least one opening to create a three-dimensional bead of the sealing material in a first configuration corresponding to a three-dimensional shape of the opening, wherein depositing the sealing material causes the sealing material to enter a channel and a pocket section, the pocket section being wider than the channel;
- removing the template from the first mating surface, wherein removing the template leaves behind the bead of the sealing material on the first mating surface; and
- positioning the second mating surface onto and in contact with the bead before the bead is cured.

19. The method of claim 18, wherein the channel has one or more sidewalls, and at least one of the sidewalls has a tilt that forms a draft angle.

20. The method of claim 18, wherein the first mating surface and the second mating surface have different shapes such that the first mating surface is wider than the second mating surface.

* * * * *